(12) United States Patent
Geyer

(10) Patent No.: US 6,378,515 B1
(45) Date of Patent: Apr. 30, 2002

(54) EXHAUST GAS RECIRCULATION APPARATUS AND METHOD

(75) Inventor: Stephen Mark Geyer, State Line, PA (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 09/590,379

(22) Filed: Jun. 9, 2000

(51) Int. Cl.[7] ............................................... F02D 41/14
(52) U.S. Cl. ...................... 123/683; 123/698; 701/108
(58) Field of Search ....................... 123/568.21–568.24, 123/568.26, 674, 679, 681–687, 698; 60/605.2, 276; 701/108

(56) References Cited

U.S. PATENT DOCUMENTS

| | | |
|---|---|---|
| 3,925,989 A | 12/1975 | Pustelnik |
| 4,142,493 A | 3/1979 | Schira et al. |
| 4,164,032 A | 8/1979 | Nohira et al. |
| 4,164,206 A | 8/1979 | Toelle |
| 4,215,550 A | 8/1980 | Dinger et al. |
| 4,440,140 A | 4/1984 | Kawagoe et al. |
| 4,446,840 A | 5/1984 | Nakagawa et al. |
| 4,450,824 A | 5/1984 | Ando et al. |
| 4,452,217 A | 6/1984 | Kawamura et al. |
| 4,594,993 A | 6/1986 | Engel et al. |
| 4,625,702 A | 12/1986 | Onishi |
| 5,363,091 A | 11/1994 | Kotwicki et al. |
| 5,440,880 A | 8/1995 | Ceynow et al. |
| 5,601,068 A * | 2/1997 | Nozaki ........................ 123/676 |
| 5,625,750 A | 4/1997 | Puskorius et al. |
| 5,703,777 A | 12/1997 | Buchhop et al. |
| 5,758,309 A | 5/1998 | Satoh |
| 5,771,867 A | 6/1998 | Amstutz et al. |
| 5,890,359 A | 4/1999 | Enander |
| 5,921,223 A | 7/1999 | Fukuma |
| 5,924,280 A | 7/1999 | Tarabulski |
| 6,009,862 A * | 1/2000 | Wanat et al. .......... 123/568.22 |

FOREIGN PATENT DOCUMENTS

| | | |
|---|---|---|
| EP | 0105828 | 4/1984 |
| EP | 0750103 | 12/1996 |
| GB | 2340258 | 2/2000 |

* cited by examiner

*Primary Examiner*—Andrew M. Dolinar
*Assistant Examiner*—Arnold Castro
(74) *Attorney, Agent, or Firm*—Rothwell, Figg, Ernst & Manbeck

(57) ABSTRACT

An exhaust gas recirculation method and apparatus adapted for use on an internal combustion engine. The apparatus includes an engine operational model, with the engine operational model capable of outputting at least one engine operational characteristic, a feedback controller portion, the feedback controller portion receiving an emissions level feedback and generating a feedback control signal based on a difference between a predetermined EGR level and the emissions level feedback, a feedforward controller portion receiving a plurality of engine sensor inputs and using the plurality of engine sensor inputs in conjunction with the engine operational model to generate a feedforward control signal, the feedforward control signal capable of changing an EGR exhaust gas flow before the plurality of engine sensor inputs show a deviation from a predetermined emissions level, and a controller receiving the feedback control signal, the feedforward control signal, and accessing the engine operational model, the controller regulating an EGR exhaust gas flow in response to the feedback control signal, the feedforward control signal, and the engine operational model.

23 Claims, 16 Drawing Sheets

EXHAUST GAS RECIRCULATION APPARATUS AND METHOD

BACKGROUND OF THE INVENTION

1. Field of the Invention

The present invention relates to a vehicle exhaust gas recirculation system.

2. Description of the Background Art

The biggest challenge to current engine and vehicle manufactures is the increasing need for improved vehicle emissions. This continues to grow in criticality as the sheer number of vehicles continue to climb. Even small improvements in emissions levels in an engine gains large importance when multiplied across thousands or millions of vehicles.

In response, emissions requirements and regulations have tended to grow more and more stringent. However, this is in opposition to performance. It is no secret that strict emissions controls tend to adversely impact driveability, with engines having low emissions having reduced acceleration capabilities and slower throttle responses. This makes clean emission engines less desirable from a driveability point of view.

One way in which emissions levels may be reduced is through the use of exhaust gas recirculation (EGR). Commonly, in a related art EGR system an EGR conduit connects an exhaust manifold to an intake manifold. An EGR valve may be opened to allow exhaust gas from the exhaust manifold to be directed into the intake manifold, wherein the exhaust gas is reburned in the engine. In this manner, partially burned components of the exhaust gas are reburned, lowering emissions levels.

Typical related art EGR systems have remained relatively simple. A related art EGR valve or controller opens under predetermined conditions, such as in response to engine timing or in response to feedback from sensors.

Such related art EGR systems are desirable in terms of cost and simplicity, but suffer from drawbacks both in emissions levels and in driveability. An EGR system that operates strictly on sensor feedback or that generates fixed, predetermined outputs based on inputs is too rigid and cannot take into account the complex variables within an internal combustion engine. For example, a related art EGR system may not control exhaust gas flow based on an engine load, a rate of change in throttle position, ambient operating conditions, or multiple internal engine conditions. In addition, related art EGR systems do not take into account changes in an engine over time due to wear, dirt, ambient operating conditions or changes therein, etc.

What is needed, therefore, are improvements in EGR systems for internal combustion engines.

SUMMARY OF THE INVENTION

An exhaust gas recirculation apparatus adapted for use on an internal combustion engine is provided according to a first aspect of the invention. The apparatus comprises an engine operational model, with the engine operational model capable of outputting at least one engine operational characteristic, a feedback controller portion, the feedback controller portion receiving an emissions level feedback and generating a feedback control signal based on a difference between a predetermined EGR level and the emissions level feedback, a feedforward controller portion receiving a plurality of engine sensor inputs and using the plurality of engine sensor inputs in conjunction with the engine operational model to generate a feedforward control signal, the feedforward control signal capable of changing an EGR exhaust gas flow before the plurality of engine sensor inputs show a deviation from a predetermined emissions level, and a controller receiving the feedback control signal, the feedforward control signal, and accessing the engine operational model, the controller regulating an EGR exhaust gas flow in response to the feedback control signal, the feedforward control signal, and the engine operational model.

An exhaust gas recirculation apparatus adapted for use on an internal combustion engine is provided according to a second aspect of the invention. The apparatus comprises at least one EGR valve positioned in a conduit between an exhaust and an intake of the engine, an engine operational model, with the engine operational model capable of outputting at least one engine operational characteristic, a feedback controller portion, the feedback controller portion receiving an emissions level feedback and generating a feedback control signal based on a difference between a predetermined EGR level and the emissions level feedback, a feedforward controller portion receiving a plurality of engine sensor inputs and using the plurality of engine sensor inputs in conjunction with the engine operational model to generate a feedforward control signal, the feedforward control signal capable of changing an EGR exhaust gas flow before the plurality of engine sensor inputs show a deviation from a predetermined emissions level, and a controller receiving the feedback control signal, the feedforward control signal, and accessing the engine operational model, the controller regulating an EGR exhaust gas flow in response to the feedback control signal, the feedforward control signal, and the engine operational model.

A exhaust gas recirculation method adapted for use on an internal combustion engine is provided according to a third aspect of the invention. The method comprises the steps of generating an EGR engine model factor from an engine model constructed of engine operational characteristics, generating an EGR feedback factor from a plurality of engine sensor inputs, generating an EGR feedforward factor from the plurality of engine sensor inputs and the engine model, and controlling an EGR exhaust gas flow based on the EGR engine model factor, the EGR feedback factor, and the EGR feedforward factor.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
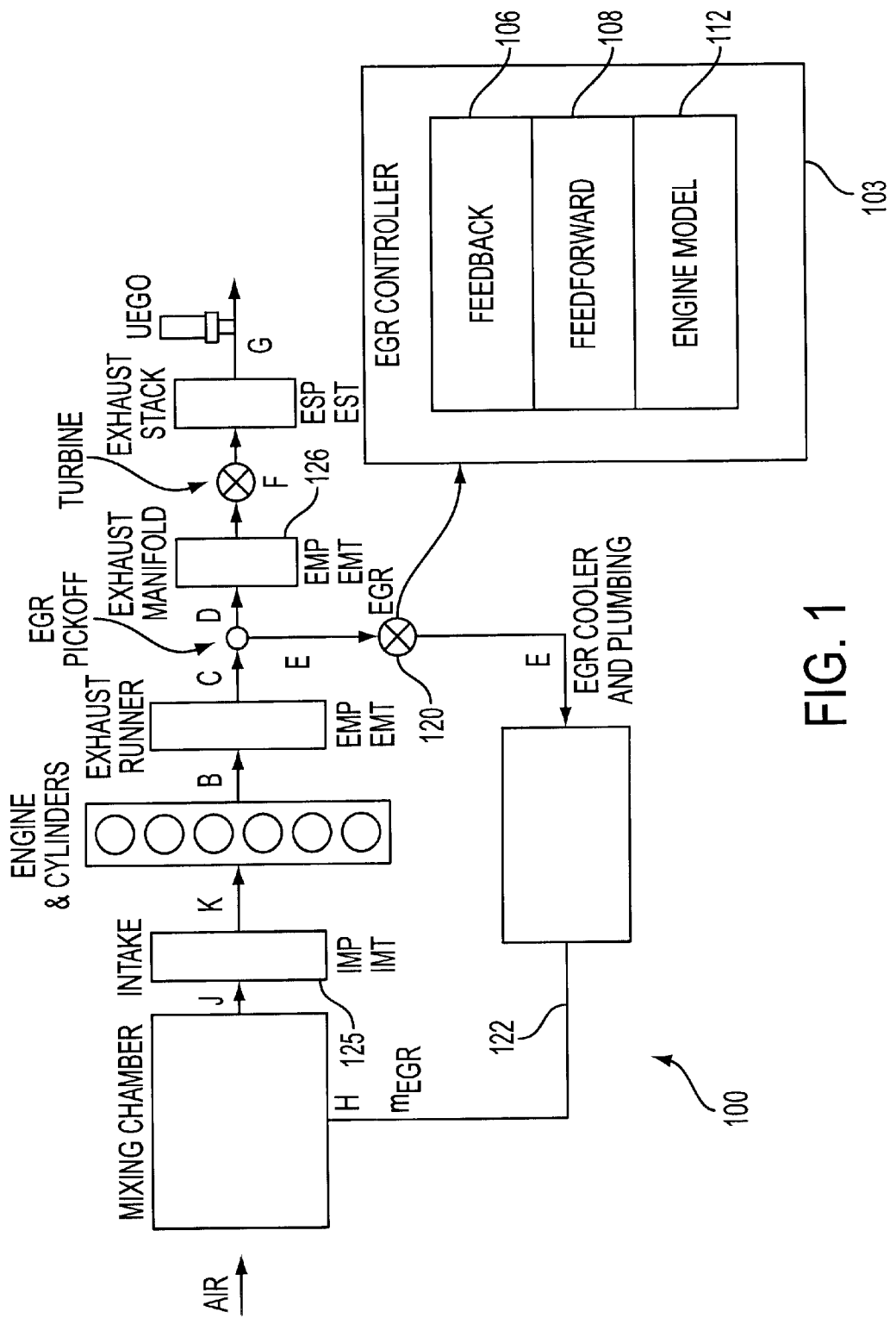
FIG. 1 shows an overview of an EGR system of the present invention.

FIG. 1 shows an overview of an EGR system 100 of the present invention. The EGR system 100 includes an EGR controller 103 having a feedback controller portion 106, a feedforward controller portion 108, and an engine model 112, and also includes an EGR valve 120.

The EGR valve 120 is located in an EGR conduit 122 extending between the intake manifold 12S and the exhaust manifold 126. The EGR controller 103 controls the opening of the EGR valve 120 in order to recirculate exhaust gas from the exhaust manifold 126 into the intake manifold 125. The controller 103 may be a dedicated hardware and software, or may preferably be integrated into an ECU.

Figure 2:
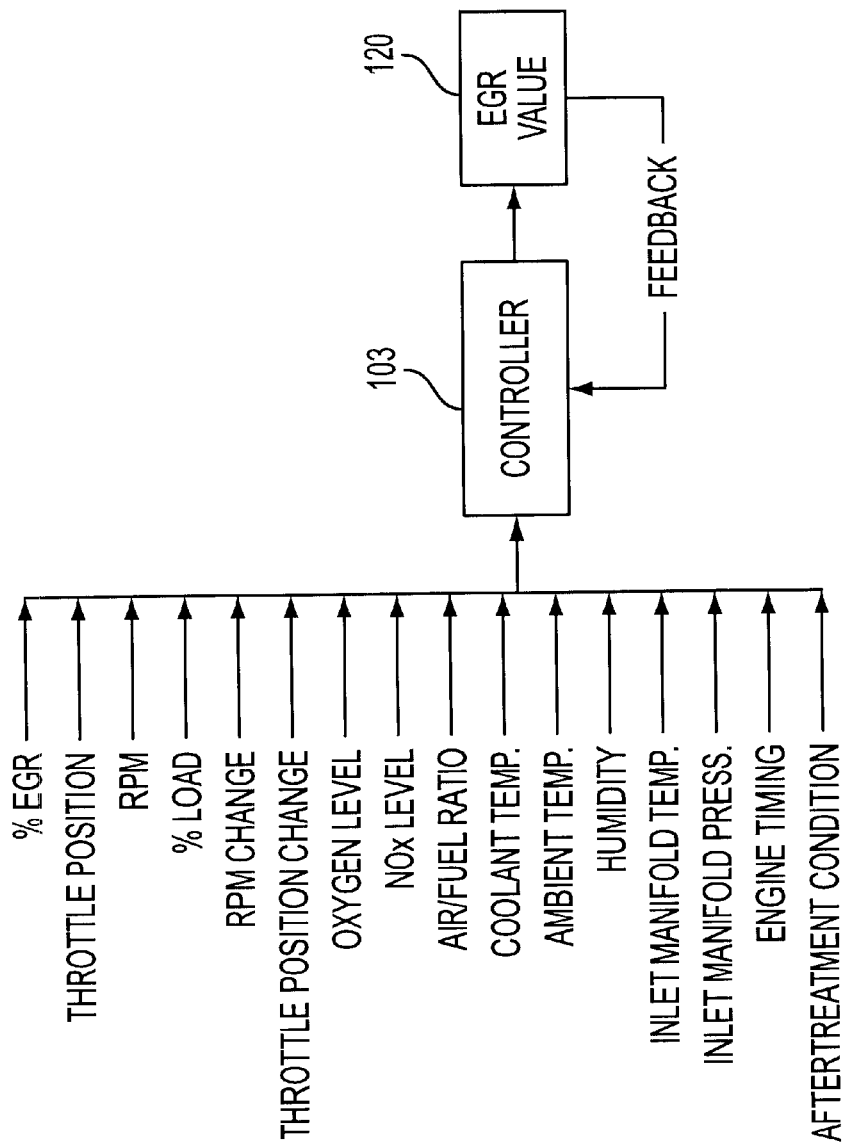
FIG. 2 shows a variety of possible engine sensors that may be used to implement the EGR controller.

FIG. 2 shows a variety of possible engine sensors that may be used to implement the EGR controller 103. They may include a percent EGR flow, throttle position (i.e., a driver input), an engine speed (i.e., RPM), a percent engine load (a ratio between a maximum load at an engine speed and an actual load at an engine speed), an RPM rate of change (a difference between engine speed history and current engine speed), a throttle position rate of change (a difference between throttle position history and current throttle position), an exhaust oxygen level, an exhaust NOx level, an intake air/fuel ratio, an engine coolant temperature, an ambient temperature, a humidity, an inlet manifold temperature, an inlet manifold pressure, an engine timing, and an after treatment condition. The aftertreatment condition refers to any after-exhaust emission apparatus that receives the exhaust gas and further treats it to remove additional pollutants. Examples are scrubbers and catalyzers.

As can be seen from the figure, an EGR valve position feedback exists between the EGR valve 120 and the controller 103. This EGR valve position feedback tells the controller 103 the position of the EGR valve 120. This is given as the percent EGR sensor input, which is the percentage of recirculated exhaust gas in the intake air flow.

The feedback controller portion 106 of the controller 103 may receive as inputs the throttle position, RPM, percent load, and NOx level (and optionally other emissions levels). The feedback controller portion 106 uses this direct feedback measured from the engine to generate a feedback control signal used in controlling the EGR valve 120. For example, the controller may receive the NOx level and use it to determine when to open or close the EGR valve 120.

The feedforward controller portion 108 may receive as inputs any or all of the possible engine sensors. The feedforward controller portion 108 uses predetermined sensor inputs in order to access rules that predict future EGR actions (as will be discussed below). For example, the throttle position rate of change input may be used to open or close the EGR valve 120 even though a current NOx feedback indicates that the NOx emissions level is at a proper level for current engine operating conditions.

The feed forward rules may be in the form of curves or tables, with a rule for a particular sensor input producing an output factor that may be combined with other output factors to form an overall EGR valve control decision.

Figure 3:
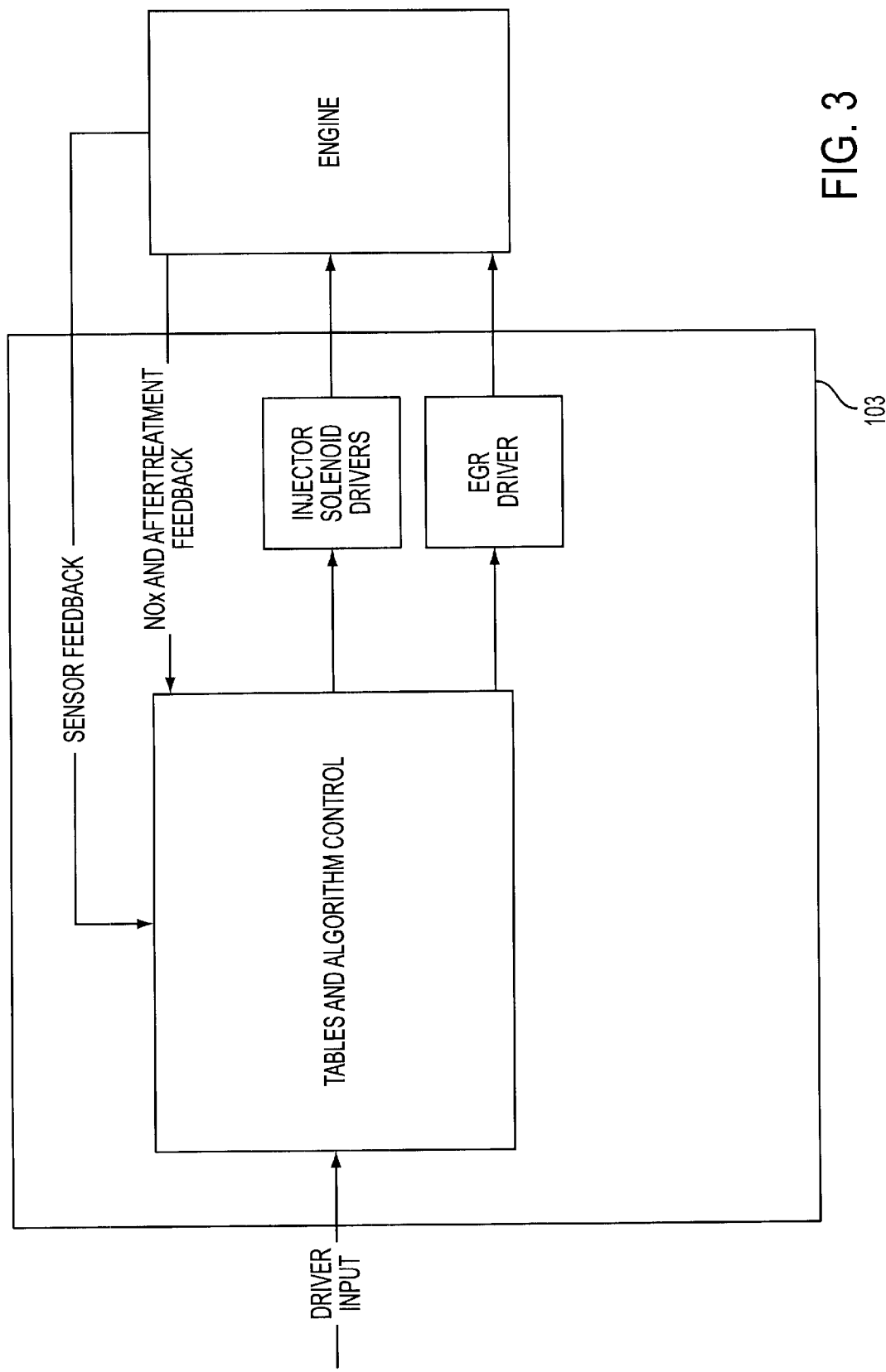
FIG. 3 shows an overall schematic of a first embodiment of the EGR system, wherein the controller receives NOx and aftertreatment feedback directly from sensors.

FIG. 3 shows an overall schematic of a first embodiment of the EGR system 100, wherein the controller 103 receives NOx and aftertreatment feedback directly from sensors. This arrangement is ideal, as the controller 103 knows exactly what is happening in the engine and can therefore control the EGR flow to a very fine degree.

Figure 4:
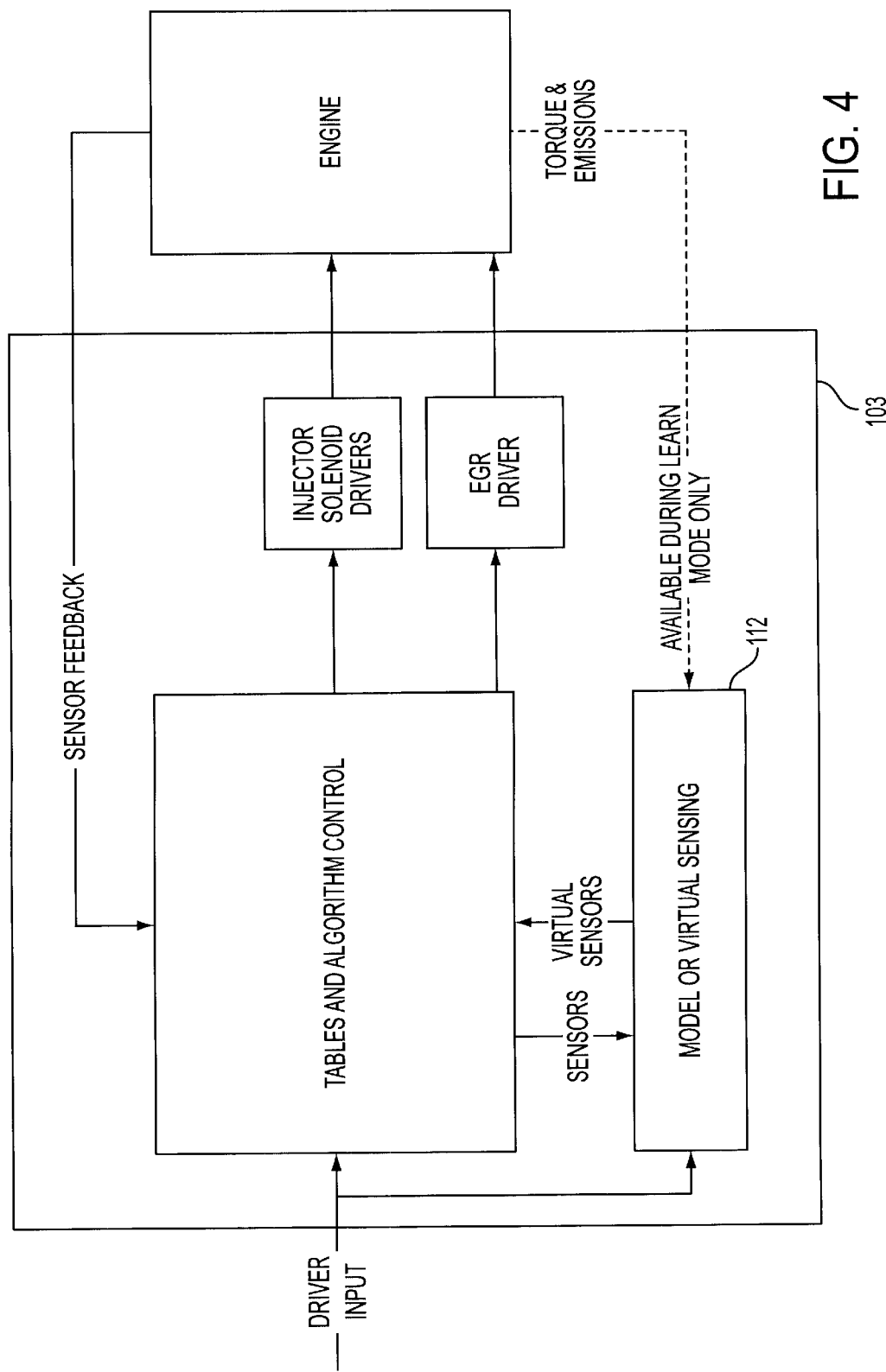
FIG. 4 shows an overall schematic of a second embodiment of the EGR system of the present invention.

FIG. 4 shows an overall schematic of a second embodiment of the EGR system 100 of the present invention. In this embodiment, the controller 103 includes an engine model 112. The engine model may act as a virtual sensor or sensors, replacing or providing sensors. For example, the NOx sensor may be replaced by a much more economical NOx table, wherein the NOx table uses engine sensor inputs to generate an expected NOx output level that is used as if it were a measured NOx level from an actual NOx sensor.

The NOx table output as described above may be further refined in a third embodiment. In the third embodiment the engine model 112 may be formed of actual, measured data instead of average values. The data is gathered during a "green test" mode. In green test, the engine is connected to a dynamometer and emissions measuring equipment. The engine's performance may therefore be tested, measured, and recorded. For example, the engine torque may be measured across the entire engine speed operating range, as well as other measurements, such as NOx emissions levels or levels of other pollutants. This actual measured data may be used to create the table or tables in the engine model 112, and will improve the accuracy of the EGR system 100. The EGR system 100 may therefore operate on actual data and not just on data averages. The actual data would be obtained during a learn mode (i.e., at the factory). This recorded data would not of course be as accurate as having full time torque and NOx sensors, but will still be more accurate than tables of average values.

Figure 5:
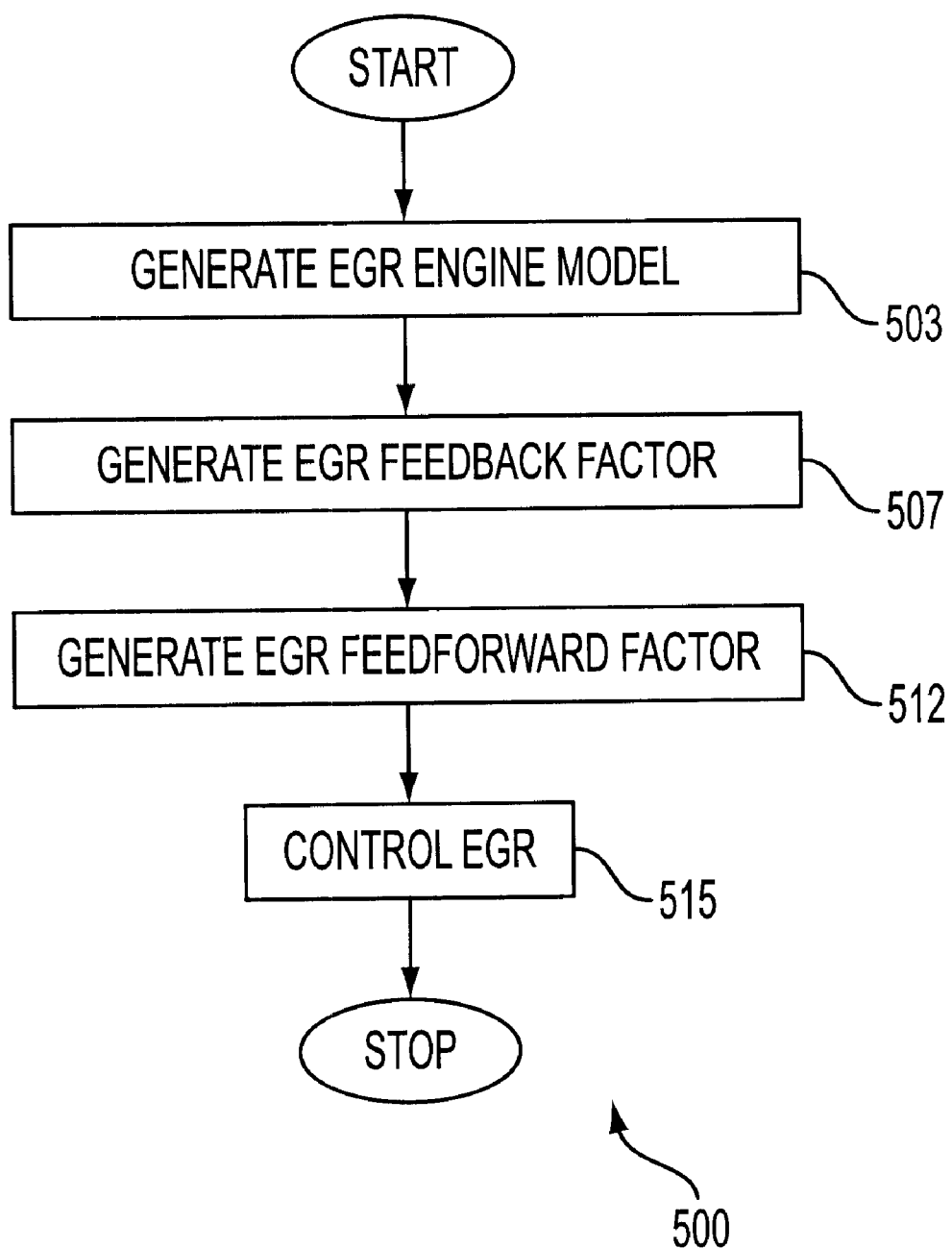
FIG. 5 shows a flowchart of the method of the present invention.

FIG. 5 shows a flowchart 500 of the method of the present invention. In step 503, an EGR engine model factor is generated. The ERG engine model factor accepts inputs from engine sensors and outputs engine operational characteristics such as emissions levels, NOx levels, engine torque, etc., from the engine model 112.

In step 507, the method generates an EGR feedback factor. The EGR feedback factor receives inputs from engine sensors and generates a feedback error signal that attempts to keep the EGR valve position equal to the EGR valve command.

In step 512, an EGR feed forward factor is generated. The ERG feed-forward factor anticipates future EGR actions.

In step 515, the engine model, feedback and feed forward EGR factors are combined to control the EGR valve.

Figure 6:
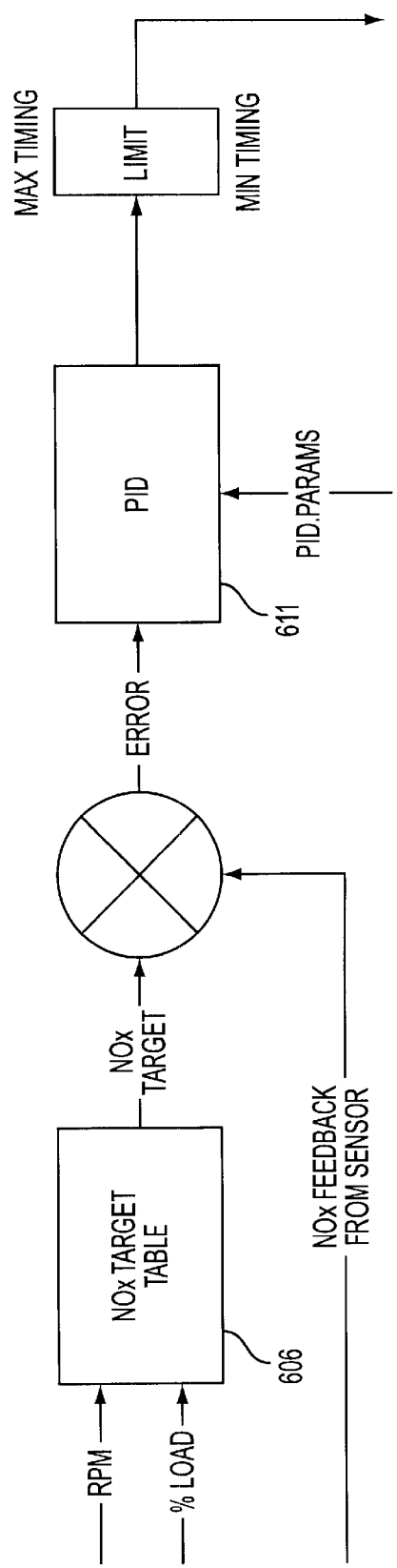
FIG. 6 shows a controller program flow of the feedback controller portion when an actual NOx sensor is present

FIG. 6 shows a controller program flow of the feedback controller portion 106 when an actual NOx sensor is present. The Nox feedback is part of the feedback controller portion 106 of FIG. 1, and is preferably implemented in software, although alternatively it could be implemented in hardware. The RPM and percent load inputs are fed into a NOx target table 606, where a target NOx level is looked up. The NOx target table 606 gives a target NOx level to be produced by the engine. It should be noted that the controller processes shown in this and subsequent figures may be implemented in a dedicated unit or may be integrated into an existing engine control unit (ECU).

The RPM and percent load inputs are fed into the NOx target table 606, where the target NOx level is looked up. The NOx target table 606 gives a target NOx level to be produced by the engine at a particular engine speed and percent load. In essence, the controller is using RPM and percent load inputs to generate what should be the expected NOx value.

The NOx target and the measured NOx level from the NOx sensor are combined to produce the error signal, which is fed to a PID proportional integration derivative 611 to produce a proportional timing control factor. This proportional timing control factor is then range checked to ensure it is within an acceptable range. The output on the right of the figure is proportional timing control crank angle output.

Figure 7:
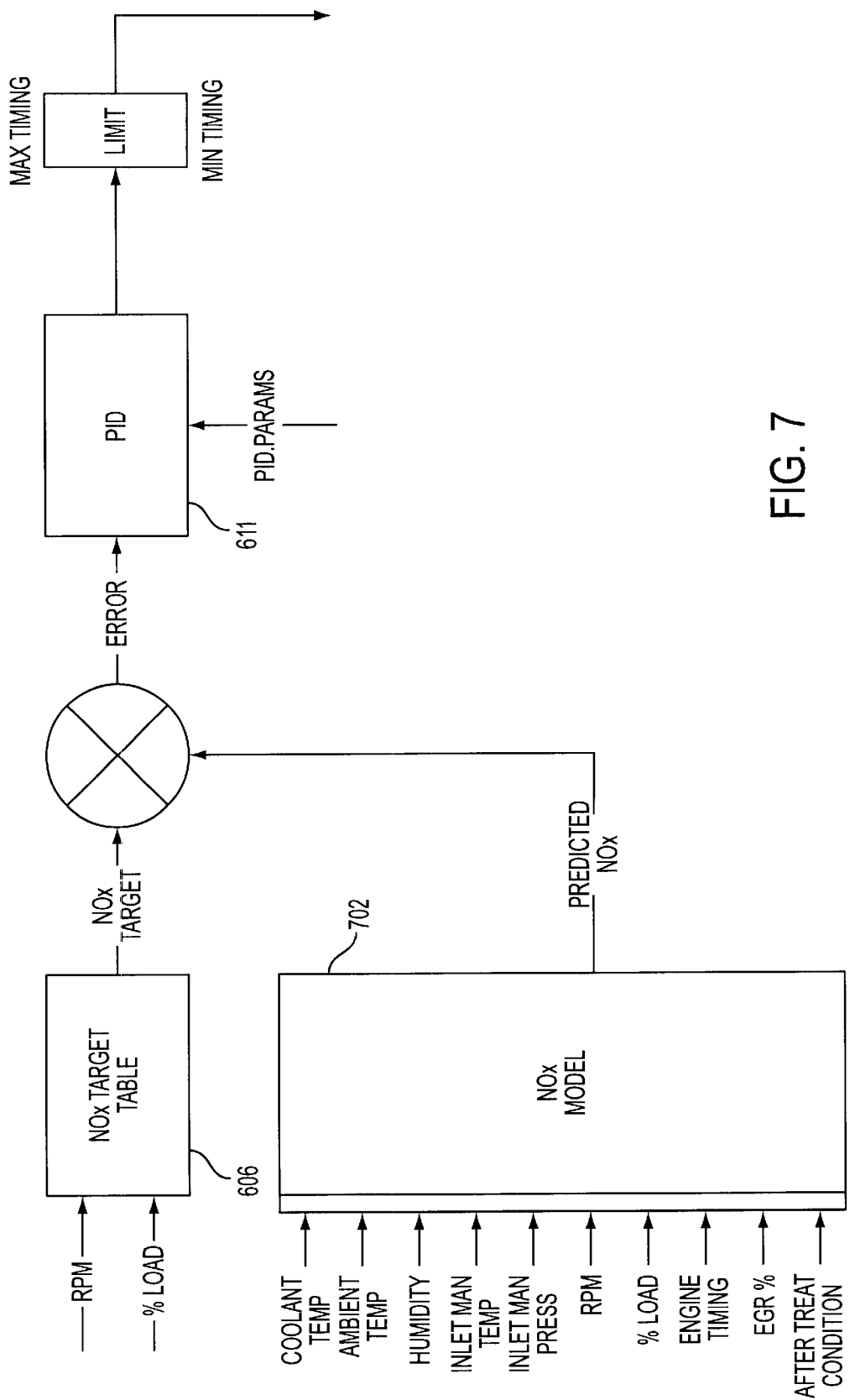
FIG. 7 shows a controller program flow of the feedback controller portion embodiment replacing the NOx sensor feedback shown in FIG. 6.

FIG. 7 shows a controller program flow of the feedback controller portion 106 embodiment replacing the NOx sensor feedback shown in FIG. 6. In this alternate embodiment the actual NOx sensor is replaced or supplemented by a NOx model 702. The NOx model 702 may be used as a substitute for an actual sensor or may be used as a backup to an actual sensor (a back-up may be employed to check on accuracy or reliability of the sensor).

The NOx model 702 may have multiple inputs and provide a predicted NOx level based on those inputs. For example, the NOx model 702 may be formed of a plurality of data tables, wherein each input value goes to an associated table and is used to produce an output factor. The output factors may be combined to form an overall predictor of NOx emissions levels given the particular inputs from engine sensors. The details of the NOx model 702 will be further discussed below in conjunction with FIG. 8.

The NOx target and the predicted NOx from the NOx model 702 are combined to produce the error signal, which is fed to a PID NOx controller 711 to produce a proportional timing control factor. This proportional timing control factor is then error checked to ensure it is within an acceptable range.

As can be seen from FIG. 7, the NOx model receives as input an engine cooling temperature and ambient temperature, a humidity, an inlet manifold temperature, an inlet manifold pressure, RPM percent load, engine timing, engine percent EGR, and after treatment conditioner inputs. In effect, the NOx model 702 becomes a virtual sensor that generates a fairly accurate NOx level without the need for an expensive NOx sensor. This embodiment therefore creates a reliable, economical and practical alternative to having an actual NOx sensor in the exhaust system of the engine.

Figure 8:
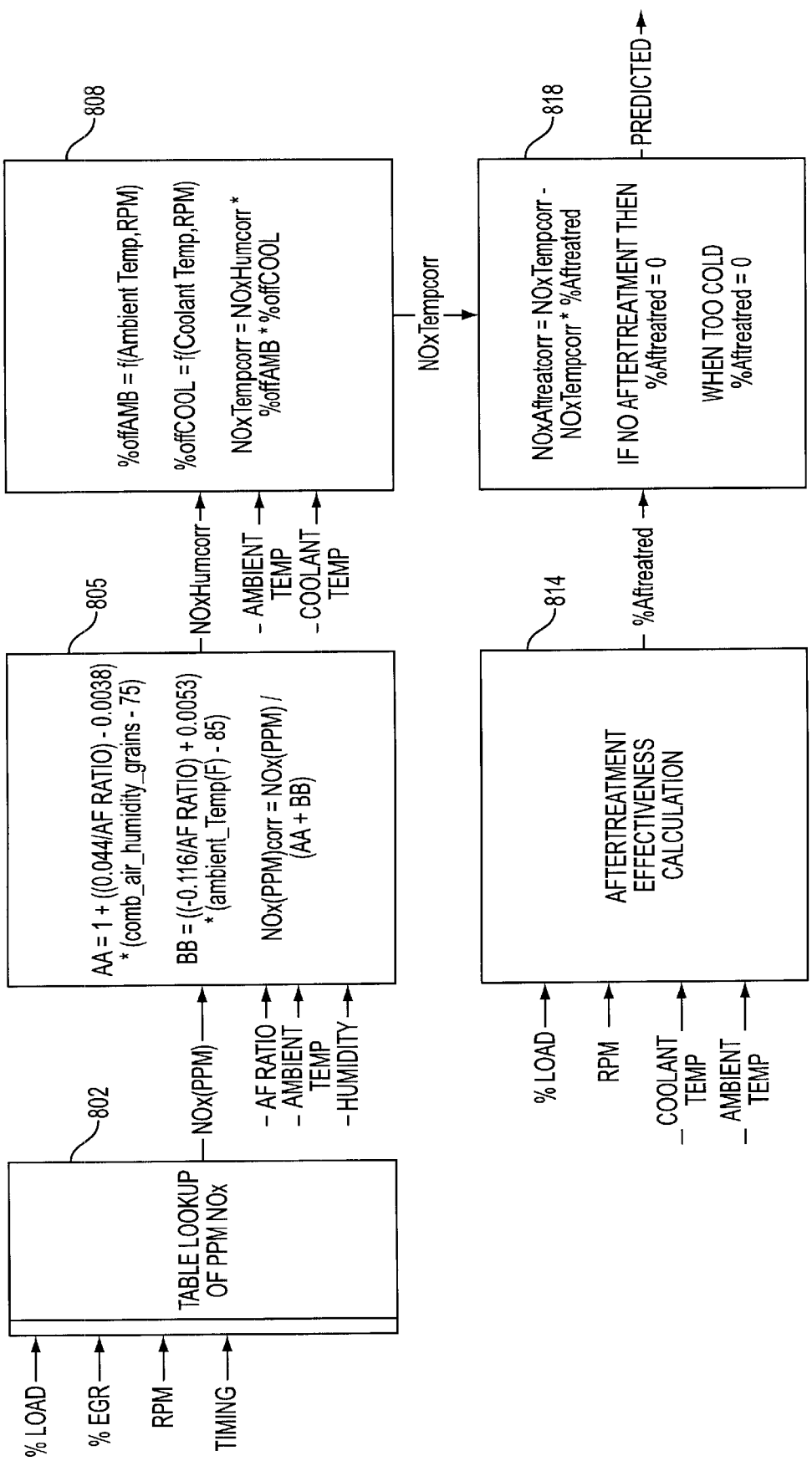
FIG. 8 shows a further algorithmic explanation of how the various inputs are used by the NOx model to generate a predicted NOx value.

FIG. 8 shows a further algorithmic explanation of how the various inputs are used by the NOx model 702 to generate a predicted NOx value. In block 802 the percent load, percent EGR, RPM and engine timing values are input to a table look-up of NOx particles, measured in parts per million (PPM). The output of block 802 is an input to block 805.

Block 805 also includes as inputs an air-to-fuel ratio, an ambient temperature, and a humidity.

$$AA=1+((0.044/AF\ Ratio)-0.0038)*(comb\_air\_humidity\_grains-75) \quad (1)$$

$$BB=((-0.116/AF\ Ratio)+0.0053)*(ambient\_Temp(F)-85) \quad (2)$$

$$Nox(PPM)corr=NOx(PPM)/(AA+BB) \quad (3)$$

Block 805 generates an NOx humidity corrected which is input to block 809.

Block 809 further has inputs of ambient temperature and engine coolant temperature.

$$\%effAMB=f(Ambient\ Temp,RPM) \quad (4)$$

$$\%effCOOL=f(Coolant\ Temp,RPM) \quad (5)$$

$$NoxTempcorr=NOxHumcorr*\%effAMB*\%effCOOL \quad (6)$$

The output of block 809 is a corrected NOx which is input into block 818.

Block 814 has an inputs percent load, RPM, engine coolant temperature, and ambient temperature. Block 814 generates an output of a percent of aftertreatment effectiveness. The aftertreatment may be any downstream exhaust pollutant treatment such as, for example, scrubbers or catalyzers. In effect, the percent aftertreatment factor gives the engine an indication of the operational capability of any aftertreatment device. For example, when the aftertreatment is dirty or overloaded, the percent aftertreatment effectiveness will be correspondingly low. The percent aftertreatment is an input into block 818, along with the corrected NOx of block 809.

Block 818 combines the temperature correction and the percent aftertreatment to generate a predicted NOx level based on humidity, temperature and aftertreatment effectiveness.

$$NoxAftreatcorr=NOxTempcorr-NOxTempcorr*\%Aftreatred \quad (7)$$

$$\text{If no aftertreatment then }\%Aftreatred=0 \quad (8)$$

$$\text{When too cold }\%Aftreatred=0 \quad (9)$$

where %Aftreatred is the percent aftertreatment effectiveness.

Figure 9:
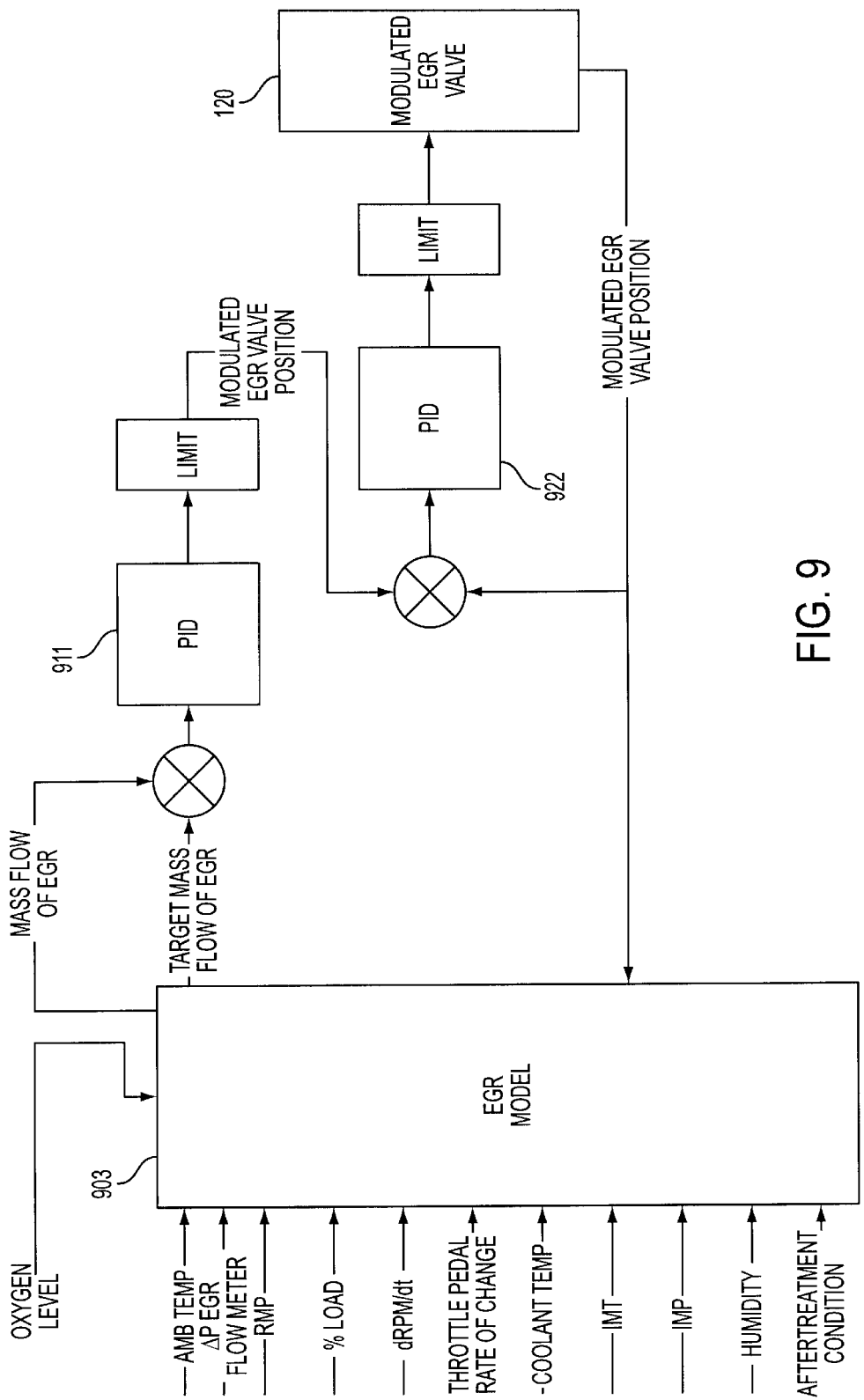
FIG. 9 shows an overall program flow for the EGR system using the EGR model.

FIG. 9 shows an overall program flow for the EGR system using the EGR model. The input sensors are an oxygen sensor (such as, for example, a universal exhaust gas oxygen (UEGO) sensor), ambient temperature, RPM, percent load, change in RPM (represented by derivative RPM), throttle pedal rate of change, engine coolant temperature, intake manifold temperature (IMT), intake manifold pressure (IMP), humidity, delta pressure of EGR flow meter, and aftertreatment condition. These various inputs are used to create a mass flow of EGR and a target mass flow of EGR, which are combined to form a mass flow difference factor. The mass flow difference factor is passed through a PID (proportional integral derivative) controller block 911 and limit checked to form an EGR valve position. In the preferred embodiment, this is a modulated EGR valve position (i.e., the EGR valve 120 may be modulated to any position between open and closed). The modulated EGR valve position is combined with a feedback from the actual EGR valve 120 to form an EGR valve difference signal which is passed through a second PID controller block 922 and a second limit check before actually modulating the position of the EGR valve 120.

Figure 10:
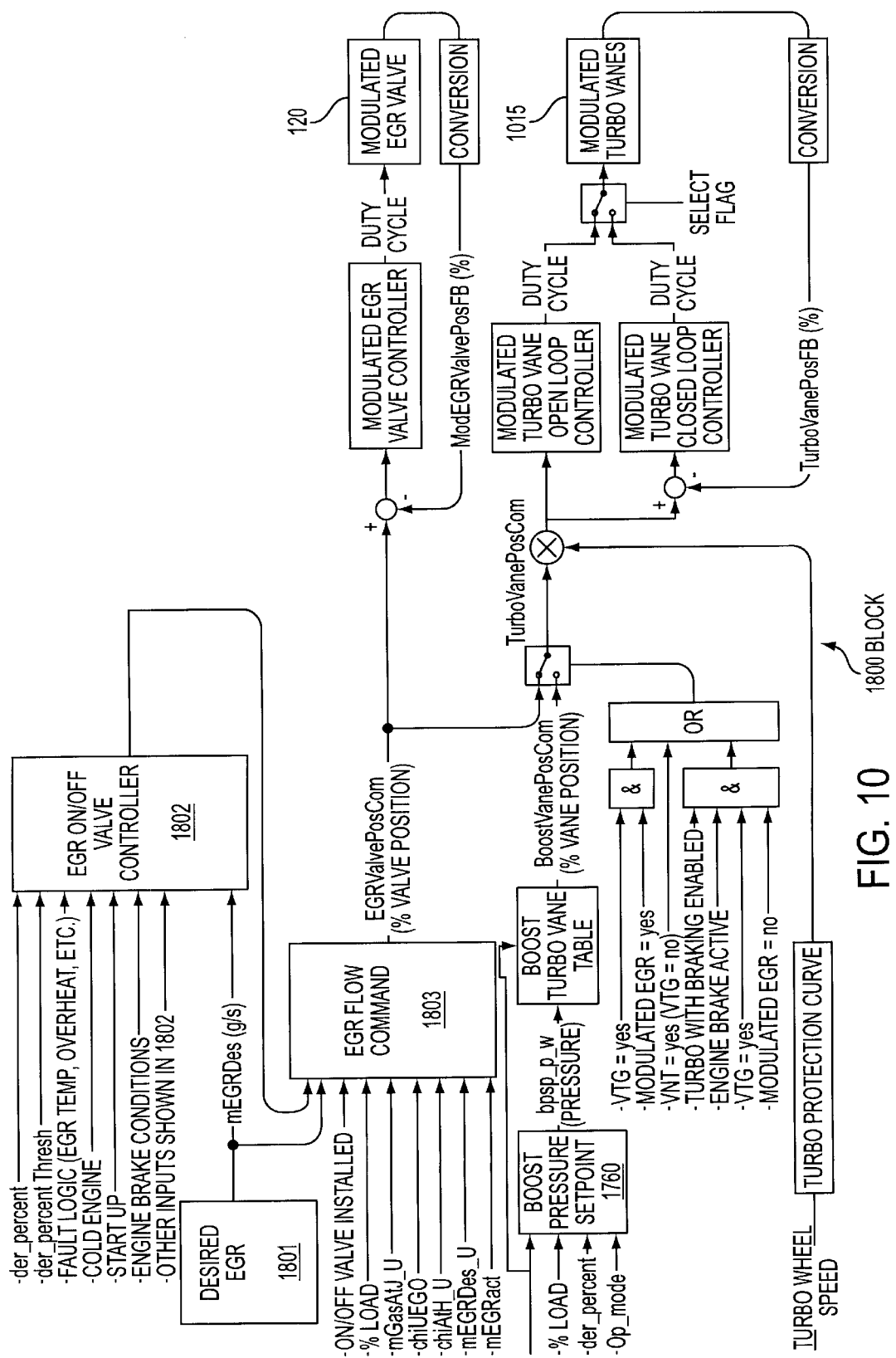
FIG. 10 is a detailed algorithmic EGR diagram.

FIG. 10 is a detailed algorithmic EGR diagram. The two hardware components of this figure are the modulated EGR valve 120 and the modulated turbo vanes 1015. The modulated turbo vanes 1015 are included in the diagram to show how the EGR system cooperates with the turbo-charger. The turbo-charger creates a back pressure in the exhaust manifold 126 that aids in diverting the EGR. The pitch of the vanes may be modulated to increase or decrease the back pressure in the exhaust manifold 126.

Figure 11:
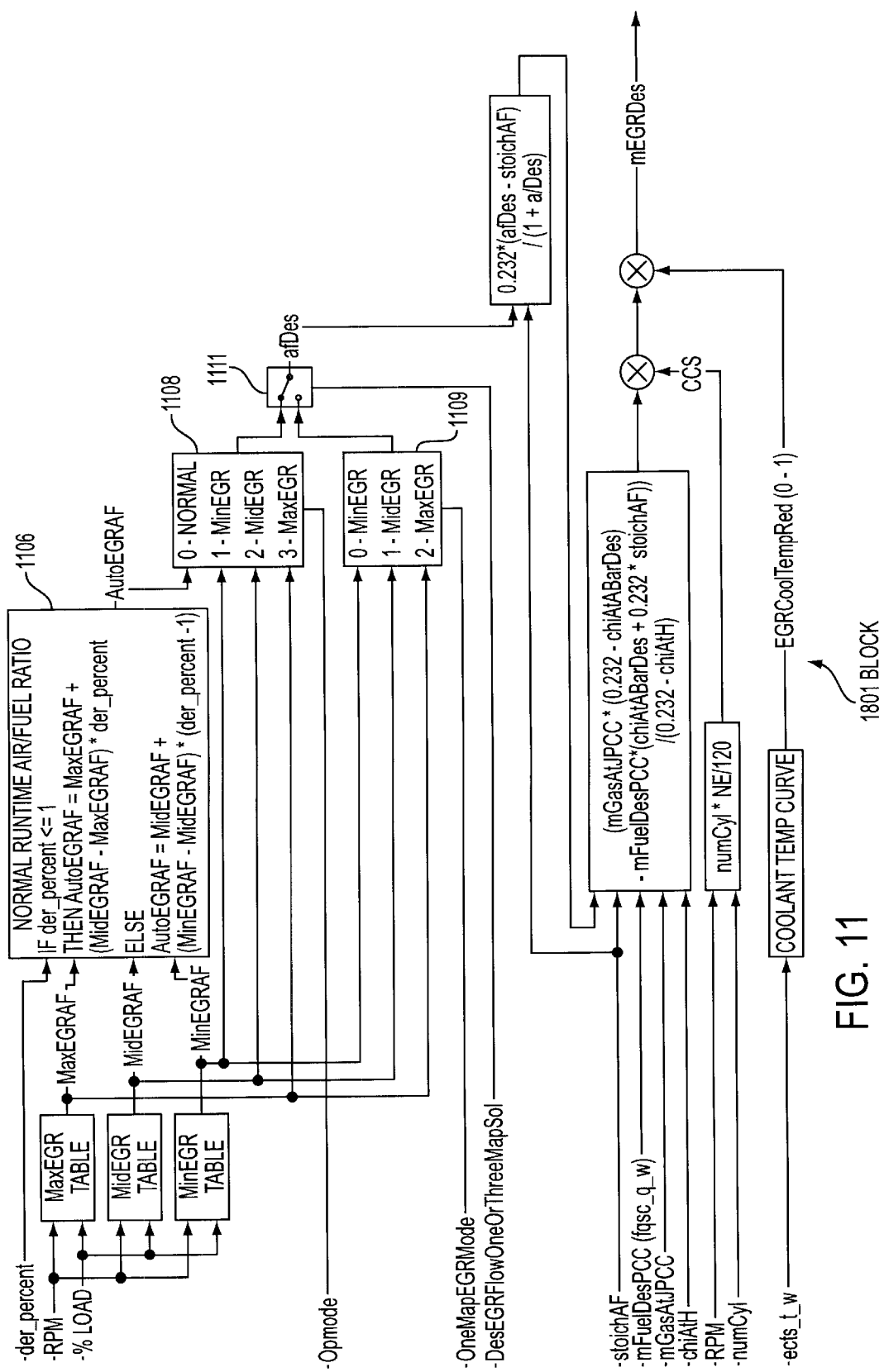
FIG. 11 shows detail of block 1801, the desired EGR.

The desired EGR mass flow rate (in g/s) is derived in block 1801, which is further discussed in conjunction with FIG. 11. This is the feedforward controller portion 108 that dictates how much EGR should take place given engine operating conditions.

Block 1802 is the EGR on/off valve logic flow, and receives inputs and generates an EGR on/off command (block 1802 enables the system to also use an on/off type EGR valve in place of the modulated EGR valve). This will be discussed further in conjunction with FIG. 12.

The desired EGR block 1801 output and the EGR on/off valve controller block 1802 output are fed into the EGR flow command block 1803. The EGR flow command block 1803 is primarily responsible for opening and closing the EGR valve 120. The EGR flow command block 1803 is discussed in further detail in FIG. 13.

The output of the EGR flow command block 1803 is the EGR valve position command which controls the position of the modulated EGR valve 120. The modulated EGR valve 120 may range from completely closed to completely open and positions in between. The EGR valve position command output is passed to a modulated EGR valve controller which creates an actual duty cycle signal that opens or closes the EGR valve 120. The EGR valve 120 has positional feedback that is fed back and subtracted from the EGR valve position command in order to maintain the EGR value 120 at the commanded position.

In addition, the output of the EGR flow command block 1803 is also fed into the turbo vane position algorithm as part of modulating the turbo vanes to create back pressure in conjunction with the operation of the EGR valve 120.

FIG. 11 shows detail of block 1801, the desired EGR. The output of block 1801 is the desired EGR mass flow rate (mEGRDes) in g/s (grams per second). In the upper left corner, the RPM and load are used to output minimum, mid, and maximum air-to-fuel ratios from respective tables. The der_percent input is a value of zero, one, or two or values in between zero and two. In a steady state, such as highway driving where the engine speed is substantially constant, the der_percent value will be zero. In cases of light acceleration, the der_percent will be a value between zero and one, while in cases of heavy acceleration it will be a value between one and two. The input variable der_percent therefore reflects a rate of change of throttle position and engine speed.

In block 1106, the der_percent is used to form the auto EGR air-to-fuel ratio (autoEGRAF). If the der_percent value is between zero and one, then $$autoEGRAF=MaxEGRAF+(MidEGRAF-MaxEGRAF)*der\_percent \quad (10)$$

else $$autoEGRAF=MidEGRAF+(MinEGRAF-MidEGRAF)*der\_percent-1) \quad (11)$$

In addition, the min, mid, and max EGR table values are fed to selectors 1108 and 1109. The selector 1108 is controlled by the Opmode variable, which may select the autoEGRAF air-to-fuel ratio of block 1106, or may select a min, mid, or max EGR air-to-fuel ratio. The Opmode can be set to a value of one or two or three during the engine calibration process to facilitate map development. A one selection causes all minimum EGR flow maps to be selected, a two selection causes all mid EGR flow maps to be selected, and a three selection causes all maximum EGR flow maps to be selected. In normal engine operation the Opmode is set to zero and the autoEGRAF output calculated from or using the der_percent is selected and passed to the switch 1111.

The selector 1109 provides the other input to the switch 1111. When a single map is found to be sufficient for EGR flow control, the variable OneMapEGRModeinput selects either a min, mid, or max EGR mode output from the previously discussed tables. Opmode is a general switch applied to all aspects of the controls whereas the single table selection operates only on the controls in block 1801.

The switch 1111 is controlled by a DesEGRFlowoneOrThreeMapSel input (selects a single map or three map strategy), with the selected output being combined with the stoichiometric air-to-fuel ratio (stoich-AF) as given by the formula $$0.232*(afDes-stoichAF)/(1+afDes) \quad (12)$$

and then further combined with a desired mass of fuel per cylinder per cycle input (mFuelDesPCC), a mass of gas flowing into the intake per cylinder per cycle input (mGasAtJPCC), and an oxygen concentration at the mixing chamber (chiAtH). This combination is given by the formula $$(mGasAtJPCC*(0.232-chiAtABarDes)-mFuelDesPCC*(chiAtABarDes+0.232*stoichAF))/(0.232-chiAtH) \quad (13)$$

The combination is further multiplied by the RPM and the number of cylinders (numcyl*RPM/120) and then multiplied by an engine coolant reduction factor. Less EGR flow is required when the engine coolant temperature is below normal operating temperature (fully hot temperature). The resulting output is the desired EGR mass flow rate (mEGRDes), which is the overall output of the desired EGR block 1801 of FIG. 10. It should be noted that although the switch 1111 and all subsequent switches are depicted as being physical switches, they are preferably implemented in software and are decisions controlled by the associated flag or input variable.

Figure 12:
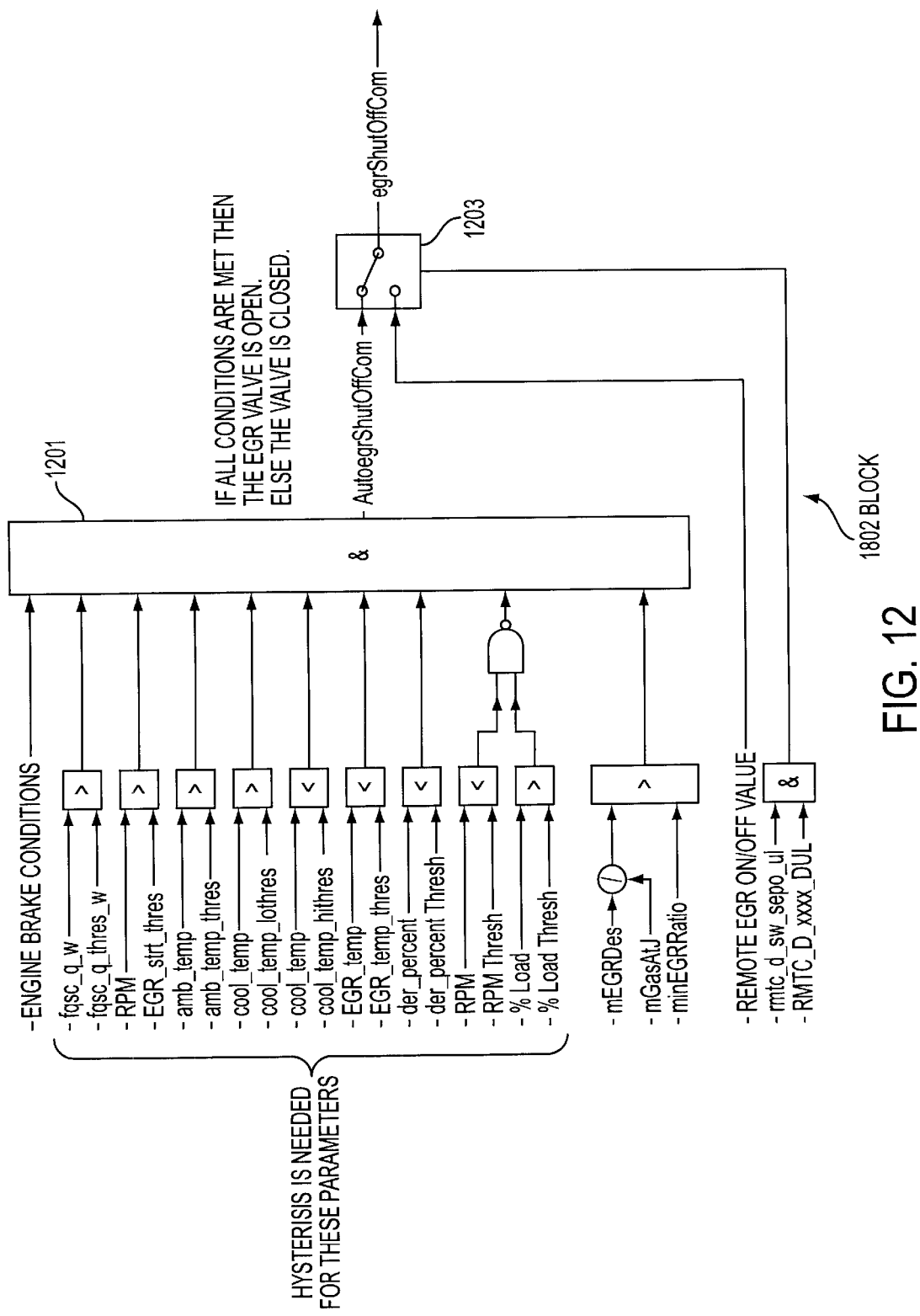
FIG. 12 shows detail of the EGR on/off valve controller block 1802.

FIG. 12 shows detail of the EGR on/off valve controller block 1802. Block 1802 receives various engine operating parameters and uses them to derive the EGR valve position. Block 1802 first performs a series of comparisons. The fuel flow (fqsc_q_w) is output to a logical AND block 1201 if it is larger than a predetermined threshold value (fqsc_q_thres_w). Likewise, RPM, ambient temperature, engine coolant temperature, EGR temperature, der_percent, and percent load are all compared to predetermined thresholds (the variable EGR_strt_thres is a minimum RPM threshold below which the EGR is not operated in order to allow the engine to start without EGR). In addition, the desired EGR mass flow rate (mEGRDes) is added to a mass gas flow at the intake manifold then compared to a minimum (relative to the total intake gas flow) EGR ratio (minEGRRatio), below which the EGR shutoff valve is closed. All of these comparison results are logically ANDed together to produce an auto EGR shutoff command (AutoegrShutOffCom). This command will open the EGR valve 120 if all of the input conditions are met. The command is input to the switch 1203. The switch 1203 also receives as an input a remote EGR on/off value.

The switch 1203 is operated by the remote flags rmtc_d_sw_sepo-Ul and RMTC_D_xxxx_DUL, which are logically ANDed together. When both are true, the switch 1203 selects the auto EGR shutoff command (AutoegrShutOffCom). Alternately, the switch 1203 may select the remote EGR on/off value for purposes of diagnostics. The remote EGR on/off value and the rmtc_flags may be used for diagnostic and testing purposes, so that the engine can be set to specific EGR diagnostic values.

Figure 13:
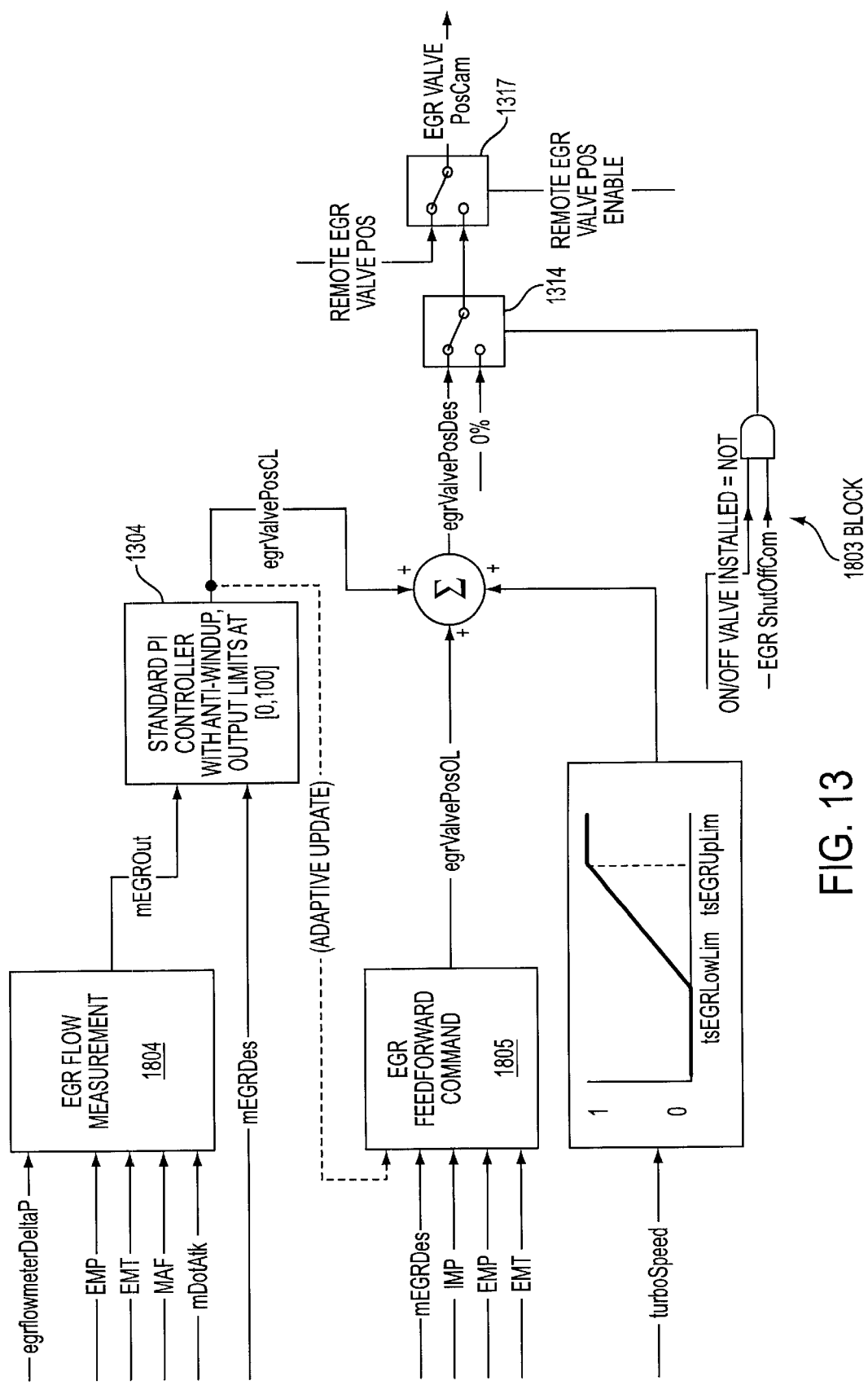
FIG. 13 shows detail of the EGR flow command block 1803.

FIG. 13 shows detail of the EGR flow command. block 1803. Block 1803 uses engine sensor inputs, in conjunction with the desired EGR mass flow rate (mEGRDes) and the EGR shutoff command to generate an EGR valve position command (EGRValvePosCom).

In block 1804, a measured pressure drop across the EGR flow meter (egrflowmeterDeltaP), the exhaust manifold pressure (EMP), the exhaust manifold temperature (EMT), the intake mass air flow (MAF), and the gas mass flow entering the engine (mDotAtK) are combined to produce a measured EGR mass flow rate output (mEGROut). Additional detail of block 1804 is discussed below in conjunction with FIG. 14.

In block 1304 (a standard PI controller function), the measured EGR mass flow rate output (mEGROut) is compared to a desired mass flow rate (mEGRDes) to produce a closed-loop term of desired EGR valve position (egrValvePosCL). The closed-loop term is a feedback error signal between measured and desired EGR mass flow rates and may be used to bring the measured EGR mass flow rate into line with the desired EGR mass flow rate.

The EGR feed forward command block 1805 may implement a feedforward capability, in conjunction with block 1304. The EGR feed forward command box 1805 is discussed further in conjunction with FIG. 15 below.

The EGR feedforward command block 1805 produces the openloop (feedforward) term of the desired EGR valve position (egrValvePosOL), which is summed with a turbo speed variable and the closed-loop term of the desired EGR valve position (egrValvePosCL) to produce the desired EGR valve position (egrValvePosDes) which is passed to the switch 1314. The switch 1314 will select the desired EGR valve position (egrValvPosDes) or may select a zero percent (closed) EGR valve position (i.e., a default). The default position will turn off the EGR in fault conditions, in conditions where there is no EGR valve, or in conditions where it is desired to be disabled. The switch 1314 selects the desired EGR valve position (egrValvPosDes) when either the on/off valve input and the EGR shutoff command are logical false values. The on/off valve installed input will be a logical false value when the EGR valve 120 is an on/off type valve, as opposed to a modulated EGR valve 120 (i.e., is not capable of a range of motion). The EGR shutoff command is the output of FIG. 12.

The output of the switch 1314 is passed to a secondary switch 1317. The switch 1317 may select the remote EGR valve position input or may select the output of the switch 1314 if the remote EGR valve position enable input is zero. The remote EGR valve position enable is another diagnostic feature, allowing the EGR valve position to be set externally, as in a diagnostic mode. The output of the switch 1317 is the EGR valve position command of FIG. 10.

Figure 14:
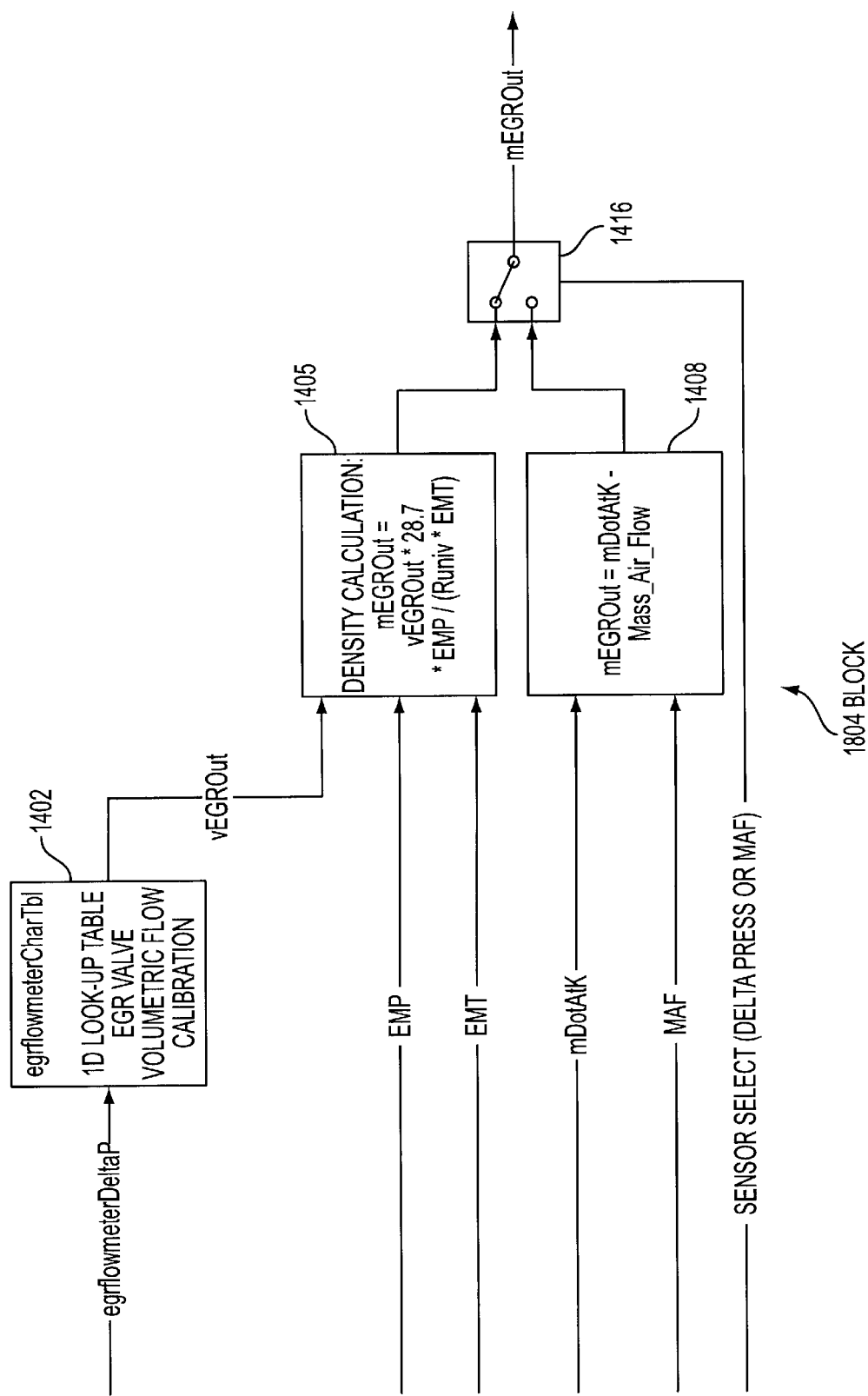
FIG. 14 shows further detail of the EGR flow measurement block 1804 of FIG. 13.

FIG. 14 shows further detail of the EGR flow measurement block 1804 of FIG. 13. In block 1402 the measured pressure drop across the EGR flowmeter (egrFlowmeterDeltaP) is used to retrieve a volumetric EGR flow (vEGROut) value from a one-dimensional volumetric flow calibration table.

In block 1405, the volumetric EGR flow, the exhaust manifold pressure (EMP), and the exhaust manifold temperature (EMT) are combined according to the equation $$vEGROut*28.7*EMP/R*EMT) \tag{14}$$

to produce the measured EGR mass flow rate output value (mEGROut). Here R is the universal gas constant. The measured EGR mass flow rate is output to the switch 1416.

In block 1408, the measured EGR mass flow rate (mEGROut) is produced by subtracting the mass air flow (MAF) from the gas mass flow entering the engine (mDotAtK). The measured EGR mass flow rate (mEGROut) is also output to the switch 1416.

The switch 1416 may select a measured EGR mass flow rate (mEGROut) generated by either the delta pressure method of block 1405 or by the mass air flow method of block 1408. The sensor select input is obtained as a software selection parameter or from the fault detection of the EGR Flow meter delta P.

Figure 15:
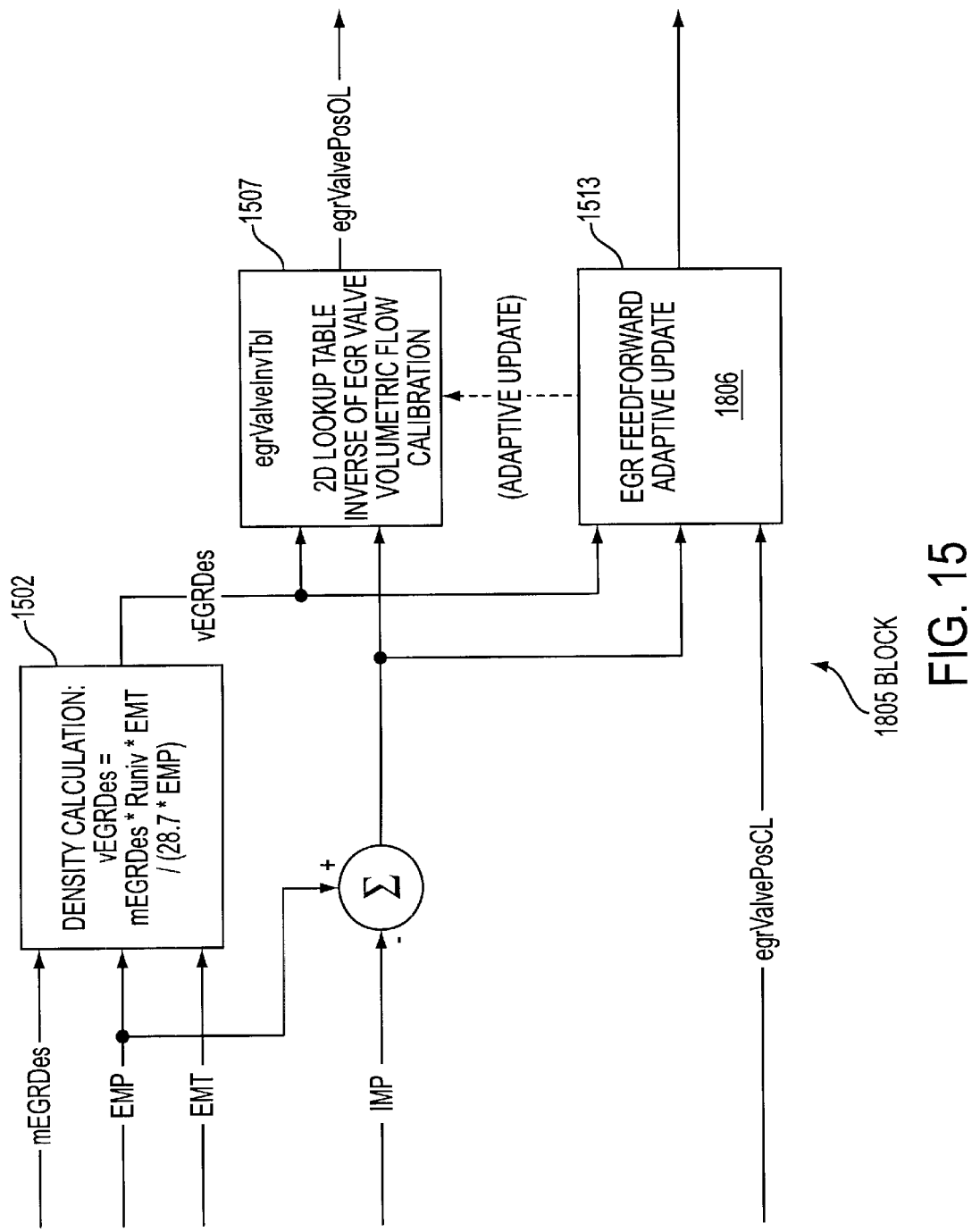
FIG. 15 shows further detail of the EGR feed forward command block 1805 of FIG. 13.

FIG. 15 shows further detail of the EGR feed forward command block 1805 of FIG. 13. Block 1502 combines the desired EGR mass flow rate (mEGRDes), the exhaust manifold pressure (EMP), and the exhaust manifold temperature (EMT) according to the formula mEGRDes*R*EMT/(28.7*EMP) to produce the desired volumetric EGR flow (vEGRDes). Here R is the universal gas constant.

In block 1507, the desired volumetric EGR flow (vEGRDes) is used in conjunction with the difference of the exhaust manifold pressure and the intake manifold pressure (EMP–MAP) to derive an open-loop term of desired EGR valve position (egrValvePosOL) from a two-dimensional lookup table. This is the feedforward output of block 1805 of FIG. 13.

Block 1507 may optionally receive an adaptive update, with the adaptive update also being used as part of the table lookup in block 1507. Block 1513 generates the adaptive update.

In block 1513, the closed-loop term of the desired EGR valve position (the feedback term egrValvePosCL), the difference of the intake and exhaust manifold pressures (EMP–MAP), and the desired volumetric EGR flow (vEGRDes) are combined to form the adaptive update.

The purpose of the adaptive learning is to recognize that the current position of the EGR valve 120 is not yielding the desired EGR. The adaptive learning component of the EGR system may therefore learn this error and factor a correction into the generation of the EGR valve position command. In effect, the adaptive learning correction factor may be used to amplify the EGR valve position command in order to drive the EGR level closer to a desired level.

Figure 16:
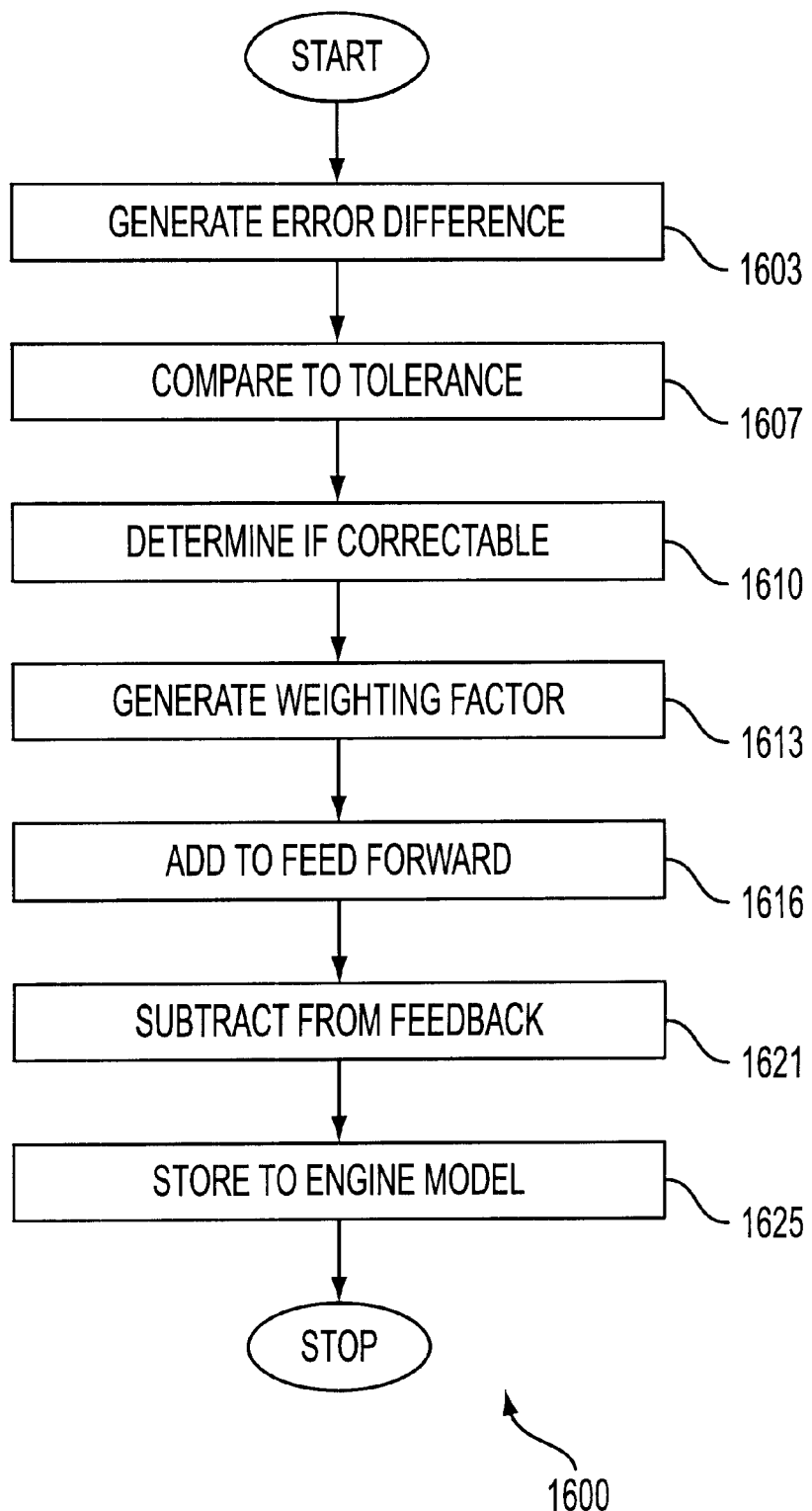
FIG. 16 shows a flowchart of the adaptive learning process of the present invention.

FIG. 16 shows a flowchart 1600 of the adaptive learning process of the present invention. In step 1603, an error difference is determined from the difference betwen the EGR valve position command and the actual EGR valve position.

In step 1607, the adaptive learning algorithm checks to see whether the error difference is within a predetermined tolerance threshold. Small error differences may be allowed.

In step 1610, the algorithm may determine whether a change will actually be performed. For example, if the EGR valve 120 is excessively dirty or blocked, boosting the EGR valve position command may have no beneficial effect. This can be determined by checking to see if previous adaptive learning changes were effective. If not, the adaptive learning algorithm may simply drop out.

In step 1613, if the above two tests pass, a weighting factor is calculated from the error difference. The weighting factor may preferably not account for the entire error difference. Instead, the weighting factor may be only a portion or small bite of the error difference, with the adaptive learning algorithm instead taking many small bites in order to iteratively remove the error difference.

In step 1616, after the weighting factor has been computed, it is added to the feedforward EGR valve position, i.e., the open-loop EGR valve position (egrValvePosoL).

In step 1621, the weighting factor is substracted from the feedback EGR valve position, i.e., the closed-loop term (egrValvePosCL).

In step 1625, it is stored into a table so that the weighting factor does not have to be repetitively calculated and applied.

There can be many mathematical embodiments of the adaptive learn algorithm. Hence the adaptive learn algorithm will have a series of equations and tables which include the following elements:

The first element performs the math and completes the inverse table which yields the desired EGR valve position given a desired volumetric EGR flow. The result from the two-dimensional table of inverse values is used to determine the tolerance threshold for error management. The comparison of the tolerance to the actual error difference is used to determine whether the error difference is capable of being corrected.

The second element includes the interpolation of weighting factors. The two-dimensional table of inverse values along with the actual error is used to compute weighting factors. The weighting factors are needed to calculate the regression vectors.

The third element involves the calculation of the regression vectors from the weighting factors. In addition, the regression vector length square value is computed as the sum of the squares of the elements of the regression vector.

The forth element updates the two-dimensional inverse table. In preferred embodiments, all of the updates should be subjected to maximum allowable updates (i.e., per step maximum), and all inverse table elements should be subjected to absolute maximum values.

The fifth element provides a correction to the closed-loop (feedback) term before the adaption table is updated. This maintains consistent positioning while the adaption is being performed. In subsequent cycles, the closed loop portion of the controls should do less and less as the feed forward with adaption having smaller and smaller errors.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An exhaust gas recirculation apparatus adapted for use on an internal combustion diesel engine, comprising:
    an engine operational model, with said engine operational model capable of outputting at least one engine operational characteristic;
    a feedback controller portion, said feedback controller portion receiving an emissions level feedback and generating a feedback control signal based on a difference between a predetermined EGR level and said emissions level feedback;
    a feedforward controller portion receiving a plurality of engine sensor inputs and using said plurality of engine sensor inputs in conjunction with said engine operational model to generate a feedforward control signal, said feedforward control signal capable of changing an EGR exhaust gas flow before said plurality of engine sensor inputs show a deviation from a predetermined emissions level; and
    a controller receiving said feedback control signal, said feedforward control signal, and accessing said engine operational model, said controller regulating an EGR exhaust gas flow in response to said feedback control signal, said feedforward control signal, and said engine operational model.

2. The apparatus of claim 1, wherein said apparatus further includes at least one EGR valve.

3. The apparatus of claim 1, wherein said apparatus is part of an engine control unit.

4. The apparatus of claim 1, wherein said engine operational model is constructed of average engine operational characteristics.

5. The apparatus of claim 1, wherein said engine operational model is constructed of measured engine operational characteristics.

6. The apparatus of claim 1, wherein said engine operational model comprises a plurality of data tables, with a data table of said plurality of data tables outputting an engine operational characteristic in response to an input from at least one engine sensor.

7. The apparatus of claim 1, wherein said engine operational model comprises a plurality of data tables, with a data table of said plurality of data tables outputting at least one engine operational characteristic in response to an input from at least one engine sensor, with said outputted at least one engine operational characteristic being selected from the group consisting of an engine torque characteristic, an emissions level characteristic, a NOx emissions level characteristic, and combinations thereof.

8. The apparatus of claim 1, wherein said engine operational model comprises a plurality of data tables, with a data table of said plurality of data tables outputting an engine operational characteristic in response to an input from at least one engine sensor, with said at least one engine sensor being selected from the group consisting of a throttle position input, a throttle position change input, an RPM input, an RPM change input, an exhaust oxygen level input, a NOX level input, an emissions level input, an engine coolant temperature input, an ambient temperature input, a humidity input, an inlet manifold temperature input, an inlet manifold pressure input, a percent load input, an engine timing input, a percent EGR input, an air-to-fuel ratio input, an aftertreatment condition input, and combinations thereof.

9. The apparatus of claim 1, wherein said plurality of engine sensor inputs are selected from the group consisting of a RPM input, a percent load input, an RPM change input, a throttle position change input, an exhaust oxygen level input, a NOx level input, an air/fuel ratio input, a coolant temperature input, an ambient temperature input, a humidity input, an inlet manifold temperature input, an inlet manifold pressure input, an engine timing input, an aftertreatment condition input, and combinations thereof.

10. The apparatus of claim 1, wherein said feedback control signal is formed from engine sensors selected from the group consisting of a NOX level input, a RPM input, a percent load input, a throttle position, and combinations thereof.

11. The apparatus of claim 1, wherein said feedforward control signal is formed from engine sensors selected from the group consisting of a throttle position input, a throttle position change input, an RPM input, an RPM change input, an exhaust oxygen level input, a NOx level input, an emissions level input, an engine coolant temperature input, an ambient temperature input, a humidity input, an inlet manifold temperature input, an inlet manifold pressure input, a percent load input, an engine timing input, a percent EGR input, an air-to-fuel ratio input, an aftertreatment condition input, and combinations thereof.

12. The apparatus of claim 1, wherein said feedforward controller portion incorporates adaptive learning.

13. The apparatus of claim 2, wherein said at least one EGR valve is positioned in a conduit between an exhaust and an intake of said engine.

14. A method of using an exhaust gas recirculation apparatus adapted for use on an internal combustion engine as defined in claim 1, comprising the steps of:

generating an EGR engine model factor from an engine model constructed of engine operational characteristics;

generating an EGR feedback factor from a plurality of engine sensor inputs;

generating an EGR feedforward factor from said plurality of engine sensor inputs and said engine model; and controlling an EGR exhaust gas flow based on said EGR engine model factor, said EGR feedback factor, and said EGR feedforward factor.

15. The method of claim 14, wherein said engine operational model is constructed of average engine operational characteristics.

16. The method of claim 14, wherein said engine operational model is constructed of measured engine operational characteristics.

17. The method of claim 14, wherein said engine operational model comprises a plurality of data tables, with a data table of said plurality of data tables outputting an engine operational characteristic in response to an input from at least one engine sensor.

18. The method of claim 14, wherein said engine operational model comprises a plurality of data tables, with a data table of said plurality of data tables outputting at least one engine operational characteristic in response to an input from at least one engine sensor, with said outputted at least one engine operational characteristic being selected from the group consisting of an engine torque characteristic, an emissions level characteristic, a NOx emissions level characteristic, and combinations thereof.

19. The method of claim 14, wherein said engine operational model comprises a plurality of data tables, with a data table of said plurality of data tables outputting an engine operational characteristic in response to an input from at least one engine sensor, with said at least one engine sensor being selected from the group consisting of a throttle position input, a throttle position change input, an RPM input, an RPM change input, an exhaust oxygen level input, a NOx level input, an emissions level input, an engine coolant temperature input, an ambient temperature input, a humidity input, an inlet manifold temperature input, an inlet manifold pressure input, a percent load input, an engine timing input, a percent EGR input, an air-to-fuel ratio input, an aftertreatment condition input, and combinations thereof.

20. The method of claim 14, wherein said EGR feedback factor is formed from engine sensors selected from the group consisting of a NOx level input, a RPM input, a percent load input, a throttle position, and combinations thereof.

21. The method of claim 14, wherein said EGR feedforward factor is formed from engine sensors selected from the group consisting of a throttle position input, a throttle position change input, an RPM input, an RPM change input, an exhaust oxygen level input, a NOx level input, an emissions level input, an engine coolant temperature input, an ambient temperature input, a humidity input, an inlet manifold temperature input, an inlet manifold pressure input, a percent load input, an engine timing input, a percent EGR input, an air-to-fuel ratio input, an aftertreatment condition input, and combinations thereof.

22. The method of claim 14, wherein said feedforward controller portion incorporates adaptive learning.

23. The method of claim 14, wherein said feedforward controller portion further includes the steps of:

generating an error difference between a predetermined desired EGR valve position and an actual EGR valve position;

comparing said error difference to a predetermined tolerance threshold;

determining whether said actual EGR valve position is capable of being corrected;

generating a weighting factor comprised of a predetermined percentage of said error difference if said error difference is greater than said predetermined tolerance threshold and if said actual EGR valve position is capable of being corrected;

adding said weighting factor to said feedforward factor;

subtracting said weighting factor from said feedback factor; and storing said weighting factor in said engine model.

* * * * *